(12) United States Patent
Whitehead et al.

(10) Patent No.: US 10,540,932 B2
(45) Date of Patent: *Jan. 21, 2020

(54) RAPID ESTIMATION OF EFFECTIVE ILLUMINANCE PATTERNS FOR PROJECTED LIGHT FIELDS

(71) Applicant: Dolby Laboratories Licensing Corporation, San Francisco, CA (US)

(72) Inventors: Lorne A. Whitehead, Vancouver (CA); Helge Seetzen, Westmount (CA); Gregory John Ward, Berkeley, CA (US); Wolfgang Heidrich, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,258

(22) Filed: Dec. 10, 2018

(65) Prior Publication Data

US 2019/0114977 A1 Apr. 18, 2019

Related U.S. Application Data

(63) Continuation of application No. 15/899,570, filed on Feb. 20, 2018, now Pat. No. 10,186,211, which is a (Continued)

(51) Int. Cl.
*G09G 3/34* (2006.01)
*G09G 3/36* (2006.01)
*G06T 3/40* (2006.01)

(52) U.S. Cl.
CPC ............ *G09G 3/3426* (2013.01); *G09G 3/36* (2013.01); *G06T 3/4007* (2013.01); *G09G 2320/0238* (2013.01); *G09G 2340/0428* (2013.01)

(58) Field of Classification Search
CPC ....... G09G 2320/0276; G09G 2360/16; G09G 2320/0626; G09G 3/3426; G09G 3/36;
(Continued)

(56) References Cited

U.S. PATENT DOCUMENTS 4,197,583 A * 4/1980 Westell ................. G01T 1/1644
250/363.02
4,827,432 A 5/1989 Kasano
(Continued)

FOREIGN PATENT DOCUMENTS

CA 2318235 8/1999
CA 2328235 10/1999
(Continued)

*Primary Examiner* — Abhishek Sarma (57) ABSTRACT

Apparatus and methods are provided that employ one or more of a variety of techniques for reducing the time required to display high resolution images on a high dynamic range display having a light source layer and a display layer. In one technique, the image resolution is reduced, an effective luminance pattern is determined for the reduced resolution image, and the resolution of the effective luminance pattern is then increased to the resolution of the display layer. In another technique, the light source layer's point spread function is decomposed into a plurality of components, and an effective luminance pattern is determined for each component. The effective luminance patterns are then combined to produce a total effective luminance pattern. Additional image display time reduction techniques are provided.

8 Claims, 9 Drawing Sheets

Related U.S. Application Data continuation of application No. 15/283,575, filed on Oct. 3, 2016, now Pat. No. 9,934,733, which is a continuation of application No. 14/979,422, filed on Dec. 27, 2015, now Pat. No. 9,478,176, which is a continuation of application No. 14/148,060, filed on Jan. 6, 2014, now Pat. No. 9,269,312, which is a continuation of application No. 13/466,065, filed on May 7, 2012, now Pat. No. 8,624,944, which is a continuation of application No. 11/831,854, filed on Jul. 31, 2007, now Pat. No. 8,174,546, which is a continuation of application No. 11/627,936, filed on Jan. 26, 2007, now Pat. No. 8,217,970, which is a continuation of application No. PCT/CA2005/000807, filed on May 27, 2005.

(60) Provisional application No. 60/591,829, filed on Jul. 27, 2004.

(58) Field of Classification Search
CPC .... G09G 2320/0238; G09G 2340/0428; G06T 3/4007
See application file for complete search history.

(56) References Cited

U.S. PATENT DOCUMENTS

| | | | |
|---|---|---|---|
| 5,654,773 A | 8/1997 | Kajimoto | |
| 6,160,596 A * | 12/2000 | Sylvester | G02F 1/133603 349/61 |
| 6,282,311 B1 | 8/2001 | McCarthy | |
| 6,282,312 B1 | 8/2001 | McCarthy | |
| 6,282,313 B1 | 8/2001 | McCarthy | |
| 6,285,784 B1 | 9/2001 | Spaulding | |
| 6,301,393 B1 | 10/2001 | Spaulding | |
| 6,335,983 B1 | 1/2002 | McCarthy | |
| 6,559,826 B1 | 5/2003 | Mendelson | |
| 6,748,106 B1 | 6/2004 | Bryant | |
| 6,754,384 B1 | 6/2004 | Spaulding | |
| 6,775,407 B1 | 8/2004 | Gindele | |
| 6,795,585 B1 | 9/2004 | Parada | |
| 6,822,760 B1 | 11/2004 | Spaulding | |
| 6,891,672 B2 | 5/2005 | Whitehead | |
| 7,052,152 B2 | 5/2006 | Harbers | |
| 7,064,740 B2 | 6/2006 | Daly | |
| 7,370,979 B2 | 5/2008 | Whitehead | |
| 7,403,332 B2 | 7/2008 | Whitehead | |
| 8,174,546 B2 | 5/2012 | Whitehead | |
| 8,199,401 B2 | 6/2012 | Ninan | |
| 8,217,970 B2 | 7/2012 | Whitehead | |
| 8,624,944 B2 | 1/2014 | Whitehead | |
| 9,269,312 B2 | 2/2016 | Whitehead | |
| 2001/0035853 A1 | 11/2001 | Hoelen | |
| 2002/0057238 A1 | 5/2002 | Nitta | |
| 2003/0090455 A1 | 5/2003 | Daly | |
| 2004/0058714 A1 * | 3/2004 | Sawamura | G06F 1/1613 455/566 |
| 2005/0083295 A1 * | 4/2005 | Daly | G09G 3/3426 345/102 |
| 2005/0184952 A1 * | 8/2005 | Konno | G09G 3/3426 345/102 |
| 2008/0192158 A1 | 8/2008 | Yoshihara | |
| 2009/0213576 A1 | 8/2009 | Chang | |

FOREIGN PATENT DOCUMENTS

| | | |
|---|---|---|
| GB | 2261086 | 5/1993 |
| JP | S62-75878 | 4/1987 |
| JP | 05-259811 | 10/1993 |
| JP | 2000-321571 | 11/2000 |
| JP | 2001-142409 | 5/2001 |
| JP | 2001-332394 | 11/2001 |
| JP | 2002-014649 | 1/2002 |
| JP | 2002-072980 | 3/2002 |
| JP | 2002-099250 | 4/2002 |
| JP | 2002-156950 | 5/2002 |
| JP | 2003-076302 | 3/2003 |
| JP | 2005-309338 | 11/2005 |
| WO | 99/40459 | 8/1999 |
| WO | 02/069030 | 9/2002 |
| WO | 03/077013 | 9/2003 |

* cited by examiner

Original PSF

FIGURE 2A

High Byte PSF

FIGURE 2B

Low Byte PSF

RAPID ESTIMATION OF EFFECTIVE ILLUMINANCE PATTERNS FOR PROJECTED LIGHT FIELDS

CROSS-REFERENCE TO RELATED APPLICATIONS

This application is a continuation of U.S. patent application Ser. No. 15/899,570, filed 20 Feb. 2018, which is a continuation of U.S. patent application Ser. No. 15/283,575 filed 3 Oct. 2016 (now issued as U.S. Pat. No. 9,934,733)), which is a continuation of U.S. patent application Ser. No. 14/979,422 filed 27 Dec. 2015 (now issued as U.S. Pat. No. 9,478,176), which is a continuation of U.S. patent application Ser. No. 14/148,060 filed 6 Jan. 2014 (now issued as U.S. Pat. No. 9,269,312), which is a continuation of U.S. patent application Ser. No. 13/466,065 filed 7 May 2012 (now issued as U.S. Pat. No. 8,624,944), which is a continuation of U.S. patent application Ser. No. 11/831,854 filed 31 Jul. 2007 (now issued as U.S. Pat. No. 8,174,546), which is a continuation of U.S. patent application Ser. No. 11/627,936 filed 26 Jan. 2007 (now issued as U.S. Pat. No. 8,217,970), which is a continuation of PCT International Application No. PCT/CA2005/000807 filed 27 May 2005, which claims priority from U.S. Patent Application No. 60/591,829 filed 27 Jul. 2004.

TECHNICAL FIELD

This invention pertains to systems and methods for displaying images on displays of the type that have two modulators. A first modulator produces a light pattern and a second modulator modulates the light pattern produced by the first modulator to yield an image.

BACKGROUND

International patent publication WO 02/069030 published 6 Sep. 2002 and international patent publication WO 03/077013 published 18 Sep. 2003, both of which are incorporated by reference herein, disclose displays which have a modulated light source layer and a modulated display layer. The modulated light source layer is driven to produce a comparatively low-resolution representation of an image. The low-resolution representation is modulated by the display layer to provide a higher resolution image which can be viewed by an observer. The light source layer may comprise a matrix of actively modulated light sources, such as light emitting diodes (LEDs). The display layer, which is positioned and aligned in front of the light source layer, may be a liquid crystal display (LCD).

If the two layers have different spatial resolutions (e.g. the light source layer's resolution may be about 0.1% that of the display layer) then both software correction methods and psychological effects (such as veiling luminance) prevent the viewer from noticing the resolution mismatch.

Electronic systems for driving light modulators such as arrays of LEDs or LCD panels are well understood to those skilled in the art. For example, LCD computer displays and televisions are commercially available. Such displays and televisions include circuitry for controlling the amount of light transmitted by individual pixels in an LCD panel.

The task of deriving from image data signals to control a light source layer and display layer can be computationally expensive. Deriving such signals can be executed by a processor of a computer's video/graphics card, or by some other appropriate processor integral to a computer, to the display itself or to a secondary device. Performance limitations of the processor can undesirably limit the rate at which successive image frames can be displayed. For example, if the processor is not powerful enough to process incoming video data at the frame rate of the video data then an observer may detect small pauses between successive frames of a video image such as a movie. This can distract the observer and negatively affect the observer's image viewing experience.

There is a need for practical, cost effective and efficient systems for displaying images on displays of the general type described above.

BRIEF DESCRIPTION OF DRAWINGS

The appended drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention may be applied in a wide range of applications wherein an image is displayed by producing a light pattern that is determined at least in part by image data, and modulating the light pattern to yield an image. The light pattern may be produced by any suitable apparatus. Some examples include:

A plurality of light sources driven by driver circuits that permit brightnesses of the light sources to be varied.

A fixed or variable light source combined with a reflection type or transmission type modulator that modulates light from the light source.

The following description relates to non-limiting example embodiments in which the light pattern is produced on one side of an LCD panel by an array of light-emitting diodes and the LCD panel is controlled to modulate the light of the light pattern to produce a viewable image. In this example, the array of LEDs can be considered to constitute a first modulator and the LCD panel constitutes a second modulator.

In general, rendering image frames or a frame set for display on an LED/LCD layer display entails the following computational steps:

1. Obtaining image data (which may be full screen or partial screen image data).
2. Deriving from the image data appropriate driving values for each LED of the first modulator, using suitable techniques well known to persons skilled in the art (e.g. nearest neighbour interpolation which may be based on factors such as intensity and colour).
3. The derived LED driving values and the point spread functions of LEDs on the LED layer as well as the characteristics of any layers between the LED layer and the LCD layer are used to determine the effective luminance pattern which will result on the LCD layer when the LED driving values are applied to the LED layer.
4. The image defined by the image data is then divided by the effective luminance pattern to obtain raw modulation data for the LCD layer.
5. In some cases, the raw modulation data is modified to address issues such as non-linearities or other artifacts arising in either of the LED or LCD layers. These issues can be dealt with using suitable techniques well known to persons skilled in the art (e.g. scaling, gamma correction, value replacement operations, etc.). For example, creating the modified modulation data may involve altering the raw modulation data to match a gamma correction curve or other specific characteristics of the LCD layer.
6. Final modulation data for the LCD (which may be the raw modulation data or the modified modulation data) and the driving data for the LEDs are applied to drive the LCD and LED layers to produce the desired image.

Various ways to reduce the computational cost of (i.e. to speed up) generating the final modulation data for use in displaying images are described herein. These include:

Performing at least some parts of the computation in a lower precision domain (for example, by performing computations in the 8-bit domain instead of in the 16-bit domain); and, Implementing one or more of the options for efficiently establishing an effective luminance pattern that are described herein.

While these techniques may be implemented individually, any suitable combinations of the techniques described herein may be used.

Effective Luminance Pattern Determination

The point spread function of each LED in an LED layer is determined by the geometry of the LED. A simple technique for determining an LED layer's total effective luminance pattern is to initially multiply each LED's point spread function (specifically, the point spread function of the light which is emitted by the LED and passes through all optical structures between the LED and LCD layers) by a selected LED driving value and by an appropriate scaling parameter to obtain the LED's effective luminance contribution, for that driving value, to each pixel on the LCD layer.

In this way, the luminance contributions of every LED in the LED layer can be determined and summed to obtain the total effective luminance pattern, on the LCD layer, that will be produced when the selected driving values are applied to the LED layer. However, these multiplication and addition operations are very computationally expensive (i.e. time consuming), because the effective luminance pattern must be determined to the same spatial resolution as the LCD layer in order to facilitate the division operation of step 4 above.

The computational expense is especially great if the LED point spread function has a very wide "support." The "support" of an LED point spread function is the number of LCD pixels that are illuminated in a non-negligible amount by an LED. The support can be specified in terms of a radius, measured in LCD layer pixels, at which the LED point spread function becomes so small that is perceptually irrelevant to an observer. The support corresponds to a number of LCD pixels that are illuminated in a significant amount by each LED.

For example, consider a hexagonal LED array in which the centre of each LED is spaced from the immediately adjacent LEDs by a distance equal to 50 of the LCD layer's pixels. If each LED has a point spread function having a support of 150 LCD pixels then each pixel in the center portion of the LCD layer will be illuminated by light from approximately 35 of the LEDs. Calculation of the effective luminance pattern for this example accordingly requires 35 operations for each pixel of the LCD layer, in order to account for the light contributed to each pixel by each relevant LED. Where the LCD layer has a high spatial resolution, this is very computationally expensive (i.e. time consuming).

Resolution Reduction

The time required to determine the effective luminance pattern produced on the LCD can be reduced by computing the effective luminance pattern at a reduced spatial resolution that is lower than that of the high resolution image which is to appear on the LCD layer. This is feasible because the point spread functions of individual light sources are generally smoothly varying. Therefore, the effective luminance pattern will be relatively slowly varying at the resolution of the LCD. It is accordingly possible to compute the effective luminance pattern at a lower resolution and then to scale the effective luminance pattern up to a desired higher resolution, without introducing significant artifacts.

The scaling may be done using suitable linear, Gaussian or other interpolation techniques. Such spatial resolution reduction yields an approximately linear decrease in the computational cost of establishing the effective luminance pattern. Many available interpolation methods that can be used to scale up an effective luminance pattern computed at a lower resolution are computationally inexpensive as compared to the computational cost of computing the effective luminance pattern at the resolution of the LCD or other second light modulator.

Using the foregoing example, a 10-times resolution reduction in both the width and height directions yields an approximate 100-times reduction in computational cost. This is because the total number of pixels in the reduced resolution image is 100-times fewer than the total number of pixels in the high resolution image which is to appear on the LCD layer. Each pixel in the reduced resolution image still receives light from 35 LEDs, necessitating 35 computational operations per pixel—but those operations are applied to 100-times fewer pixels in comparison to a case in which the computations are performed separately for every pixel in the actual high resolution image which is to appear on the LCD layer.

Point Spread Function Decomposition

The computational cost of image rendering can also be reduced by decomposing the point spread function of each light source (e.g. each LED) into several components (e.g. by performing a Gaussian decomposition) in such a way that the recombination of all of the components yields the original point spread function. An effective luminance pattern can then be determined separately for each component. Once an effective luminance pattern has been determined for each component, those effective luminance patterns can be combined to produce a total effective luminance pattern. The combination may be made by summing, for example.

Computing the effective luminance patterns contributed by the components may be performed at the resolution of the LCD layer or at a reduced resolution, as described above.

A speed benefit is attained even if the effective luminance pattern for each component is computed at the resolution of the LCD layer since hardware components specially adapted to perform rapid computations based upon standard point spread functions (e.g. Gaussian point spread functions) are commercially available. Such hardware components are not normally commercially available for the typically non-standard point spread function of the actual LEDs in the display's LED layer—necessitating resort to considerably slower computational techniques using general purpose processors.

Figure 1:
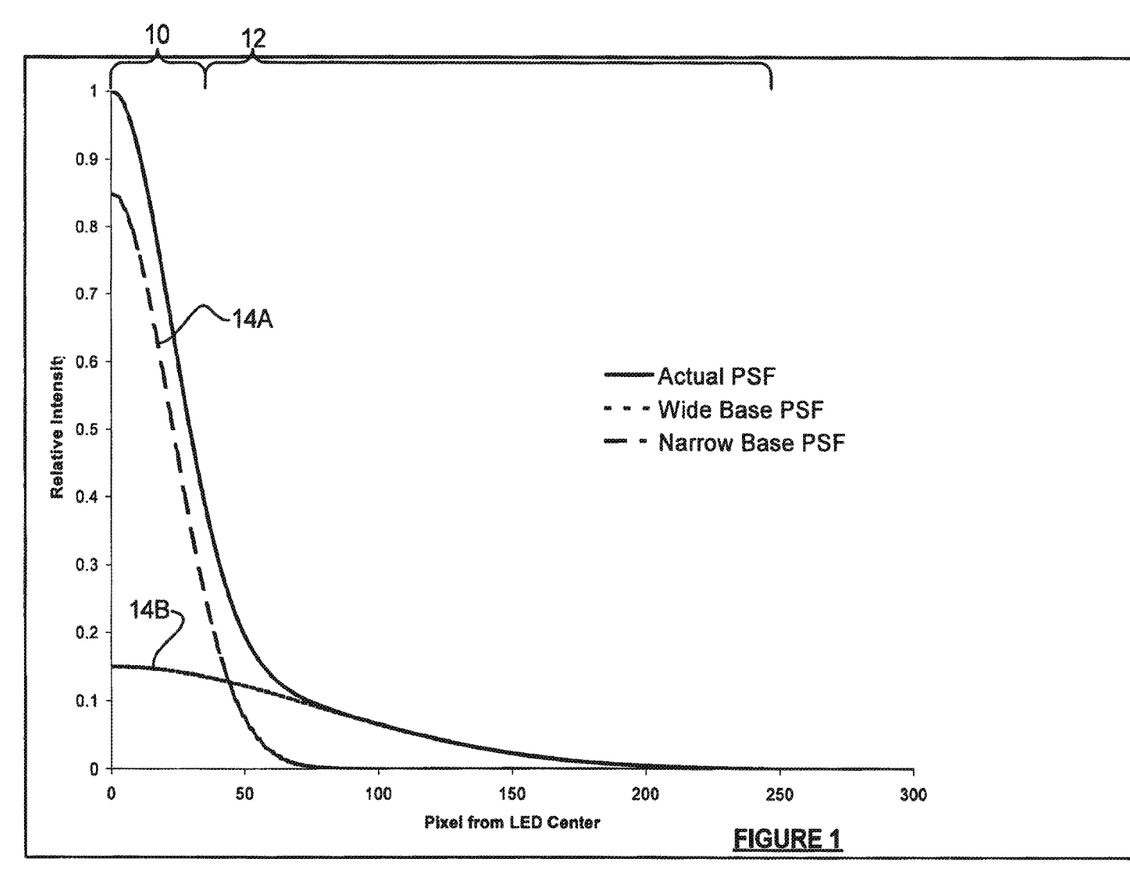
FIG. 1 graphically depicts segmentation of a point spread function (PSF) into narrow and wide base Gaussian segments.

A greater speed benefit is attained if the resolution reduction technique described above is used to determine an effective luminance pattern for each component. Moreover, different spatial resolutions can be applied to different components of the point spread functions to yield even greater speed benefits. For example, FIG. 1 depicts (solid line) an example LED point spread function having a steep central portion 10 and a wide tail portion 12. In this situation, the actual point spread function can be decomposed into a narrow base Gaussian component 14A and a wide base Gaussian component 14B, as depicted.

The wide base Gaussian component 14B (dotted line) contributes relatively little image intensity, in comparison to narrow base Gaussian segment 14A (dashed line). Further, wide base Gaussian component 14B is more slowly varying than narrow base Gaussian component 14A. Accordingly, an effective luminance pattern for narrow base Gaussian component 14A may be determined at a moderately high spatial resolution while an effective luminance pattern for the wide base Gaussian component 14B can be computed at a significantly lower spatial resolution. This preserves a substantial portion of the image intensity information contained in narrow base Gaussian component 14A and is still relatively fast since the effective support of the narrow base Gaussian segment is small and thus few LCD pixels are covered by that component. By contrast, since wide base Gaussian component 14B contains relatively little image intensity information, that component can be processed relatively quickly at low resolution without substantially degrading the resolution of the total effective luminance pattern produced by combining the patterns derived for each component.

8-Bit Segmentation

Image data is typically provided in 16-bit word form. High-end (i.e. more expensive) graphic processors typically perform computations in the 16-bit domain. Such processors may have dedicated 16-bit or floating point arithmetic units that can perform 16-bit operations quickly. The need for a high-end processor capable of performing 16-bit operations quickly can be alleviated by computing the effective luminance pattern in the 8-bit domain. Such computations can be performed reasonably quickly by less expensive processors.

Each LED's point spread function is a two dimensional function of intensity versus distance relative to the center of the LED. Such a point spread function may be characterized by a plurality of 16-bit data words. Where the point spread function is represented by a look up table, many 16-bit values are required to define the point spread function; for example, one value may be provided for every LCD pixel lying on or within a circle centered on the LED and having a radius corresponding to the support of the point spread function.

Figure 2A:
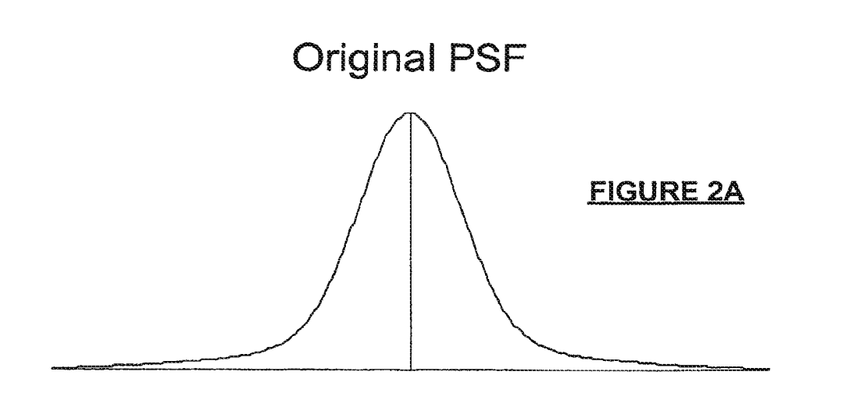
FIGS. 2A, 2B and 2C graphically depict the splitting of a 16-bit point spread function (PSF) into two 8-bit (high and low byte) segments.
Figure 2B:
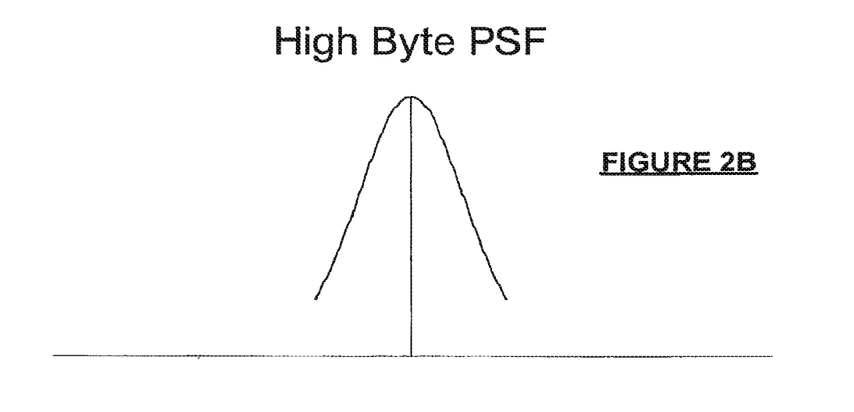
Figure 2C:
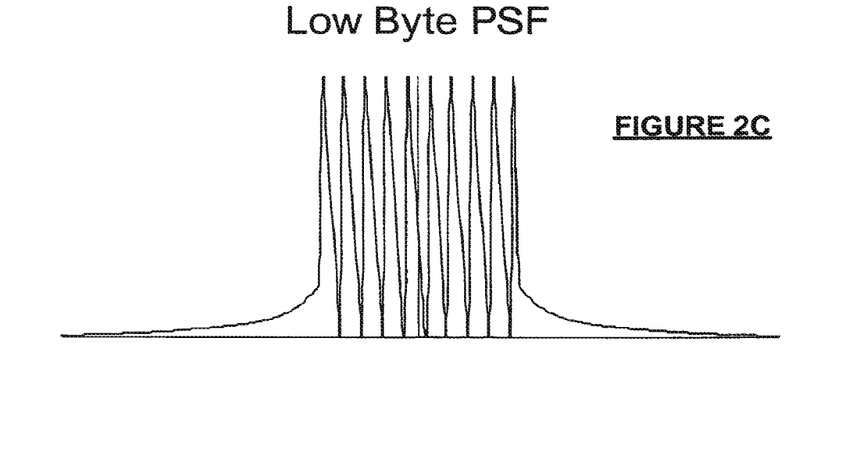

Each one of those 16-bit data words has an 8-bit high byte component and an 8-bit low byte component (any 16-bit value A can be divided into two 8-bit values B and C such that $A=B*2^8+C$, where B is the "high byte" and C is the "low byte"). The 8-bit values are preferably extracted only after all necessary scaling and manipulation operations have been applied to the input 16-bit data. FIG. 2A depicts a 16-bit point spread function; FIGS. 2B and 2C respectively depict the 8-bit high and low byte components of the FIG. 2A 16-bit point spread function.

A 16-bit data word is capable of representing integer values from $2^0-1$ to $2^{16}-1$ (i.e. from 0 to 65535). An 8-bit byte is capable of representing integer values from $2^0-1$ to $2^8-1$ (i.e. from 0 to 255). The "support" (as previously defined) of a point spread function characterized by an 8-bit high byte component is much smaller (narrower) than the support of the point spread function as a whole. This is because the 8-bit high byte component reaches the lowest value (zero) of its 255 possible values, when the 16-bit data word characterizing the point spread function as a whole reaches the value 255 out of its range of 65535 possible values. The remaining 255 values are provided by the low byte component with the high byte component's value equal to zero. The effective luminance pattern corresponding to the narrow base 8-bit high byte component can accordingly be rapidly determined, without substantial loss of image intensity information. The resolution reduction and/or other techniques described above may be used to further speed up the determination of the effective luminance pattern for the 8-bit high byte component.

The support of a point spread function characterized by an 8-bit low byte component is comparatively wide. Specifically, although the 8-bit low byte component has only 255 possible values, those values decrease from 255 to 0 (out of 65535 values for the point spread function as a whole) and those 255 values correspond to the 255 lowest intensity levels (i.e. levels at which the value of the high byte component is equal to zero). Those 255 levels represent the value of the point spread function in its peripheral parts.

Figure 3:
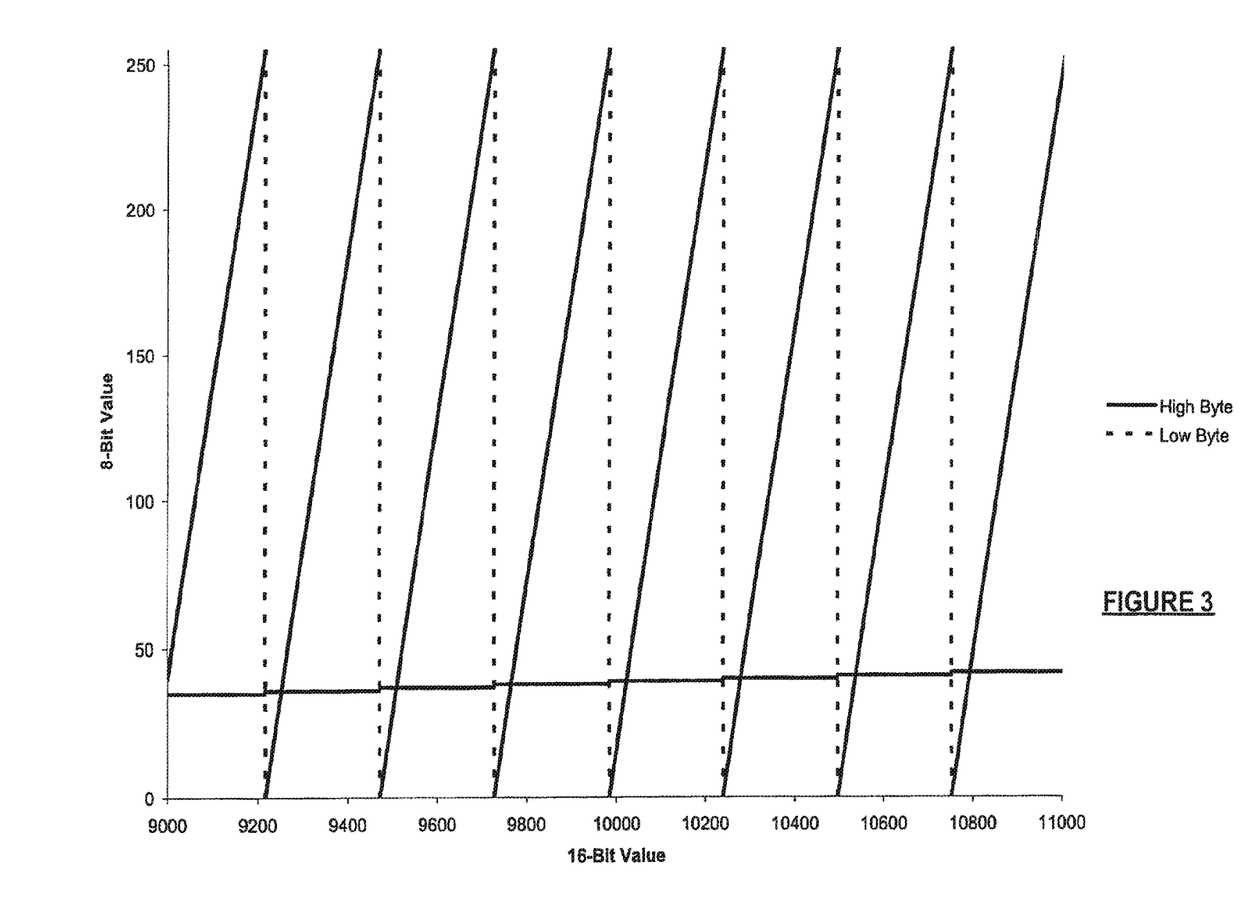
FIG. 3 graphically depicts the transitional behaviour of 8-bit high and low byte point spread function values relative to a 16-bit range.

The low byte component can be separated into two regions. A central region, lying within the boundary on which the point spread function characterized by the high byte component reaches zero. In the central region the low-byte component typically varies in an irregular sawtooth pattern (as depicted in FIG. 3) if the original 16-bit point spread function is reasonably smooth. This is because, in the central region, the portion of the point spread function characterized by the low byte component augments the portion of the point spread function characterized by the high byte component.

For example, consider a transition from the 16-bit value 10239 to the 16-bit value 9728. The 16-bit value 10239 has a high byte component value of 39 and a low byte component value of 255 (i.e. 39*256+255=10239). Consequently, the low byte component's contribution to the point spread function is initially 255 and the high byte component's contribution is initially 39. The value of the high byte component's contribution remains at 39, while the value of the low byte component's contribution smoothly decreases from 255 to 0—the point at which the original 16-bit point spread function has the value 9984 (i.e. 39*256+0). The value of the high byte component's contribution to the point spread function then changes smoothly from 39 to 38, but that change is accompanied by an abrupt change (from 0 to 255) in the value of the low byte component's contribution to the point spread function.

Figure 4:
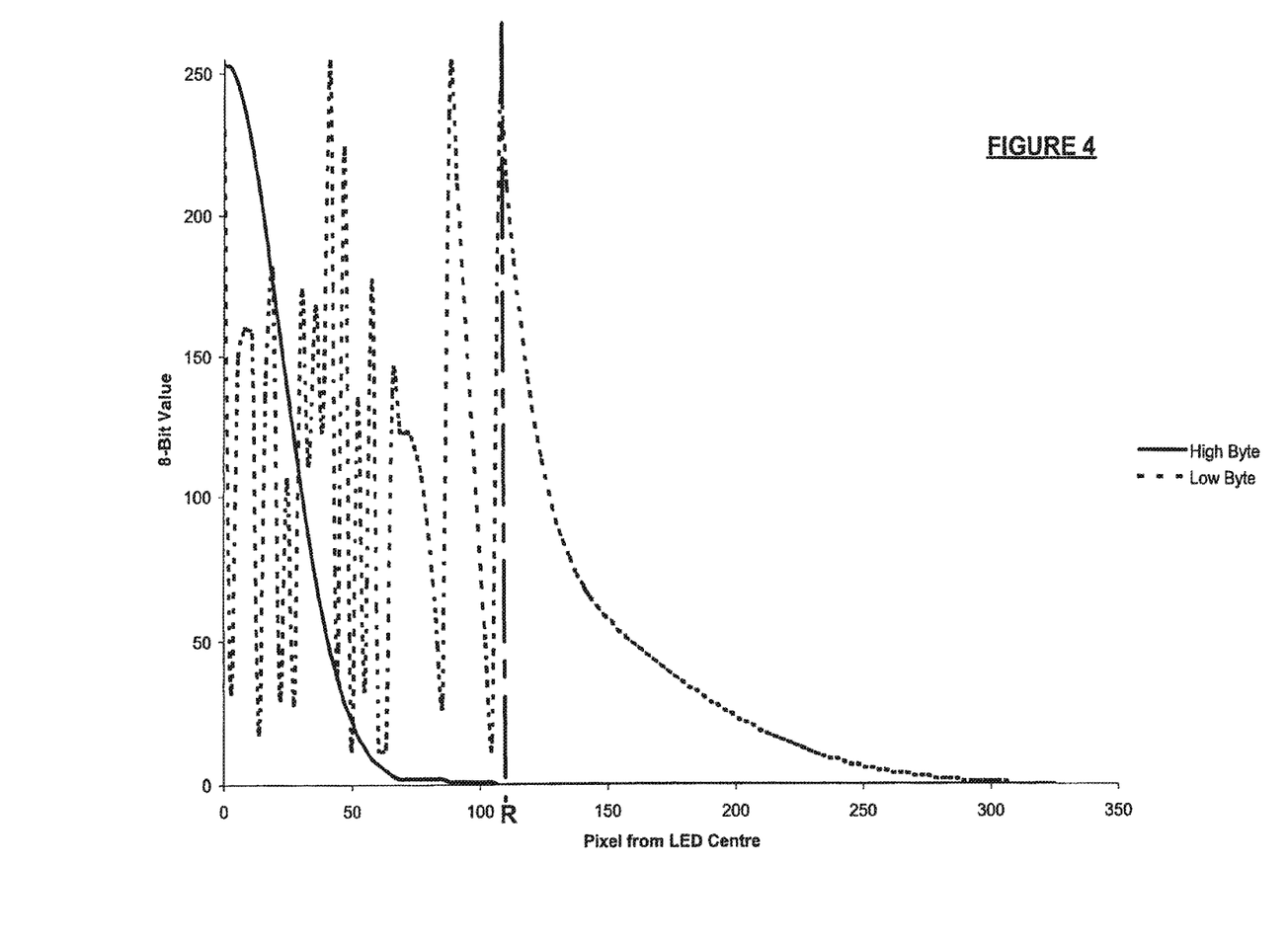
FIG. 4 graphically depicts high and low byte point spread functions corresponding to the point spread function depicted in FIG. 1.

As seen in FIG. 4, inside a radius R of the original point spread function (and where the value of the high byte component's contribution to the point spread function is non-zero) the resulting saw-tooth pattern of the low byte component's contribution to the point spread function is characteristic of the original point spread function. Outside the radius R, the value of the high byte component's contribution to the point spread function is zero, and the value of the low byte component's contribution changes smoothly.

The contributions from the low-byte component of the point spread function can be processed differently in these two regions (i.e. the regions inside and outside the radius R) to avoid unwanted artifacts. For example, to preserve a substantial portion of the image intensity information contained in the region inside the radius R, the effective luminance pattern for that region is preferably determined using the same relatively high resolution used to determine the effective luminance pattern for the high byte component's contribution to the point spread function, as previously described. By contrast, the effective luminance pattern for the region outside the radius R can be determined using a much lower resolution, without substantial loss of image intensity information.

After the three point spread function segments (i.e. the high byte component, the region of the low byte component inside the radius R, and the region of the low byte component outside the radius R) have been processed as aforesaid, the results are individually up-sampled to match the resolution of the LCD layer, then recombined with appropriate scaling factors being applied. Recombination typically involves summation of the values for the two low byte component regions and the value for the high byte component, after the value for the high byte component has been multiplied by 256.

Interpolation

If an effective luminance pattern value is determined using a resolution lower than the resolution of the LCD layer, it is necessary to up-sample that value to match the resolution of the LCD layer. Interpolation techniques for up-sampling low resolution images into high resolution images are well known, with both linear and Gaussian based techniques being common. Although such prior art techniques can be used in conjunction with the above described techniques, accuracy, or speed, or both may be improved by utilizing an interpolation technique which is optimized for a particular display configuration. Optimization facilities higher resolution image compression, minimizes introduction of unwanted interpolation artifacts, and reduces the image rendering time. In extreme cases, an interpolation technique can be used to reduce the resolution of the effective luminance pattern resolution to match the resolution of the LED layer.

Prior art interpolation techniques are often restricted to use with specific pre-interpolation data, or to use with specific interpolation functions. The interpolation techniques used to match the resolution of the effective luminance pattern to that of the LCD display do not need to satisfy such restrictions, provided convolution of the pre-interpolation data with the selected interpolation function will yield an effective luminance pattern having adequate similarity to the actual effective luminance pattern.

The required degree of similarity depends on the display application. Different applications require different degrees of similarity—in some applications relatively small deviations may unacceptably distract an observer, whereas larger deviations may be tolerable in other applications (such as applications involving television or computer game images in which relatively large deviations nonetheless yield images of quality acceptable to most observers). Consequently, it is not necessary to apply the interpolation technique directly to the actual LED driving values or to the actual LED point spread function.

Figure 5:
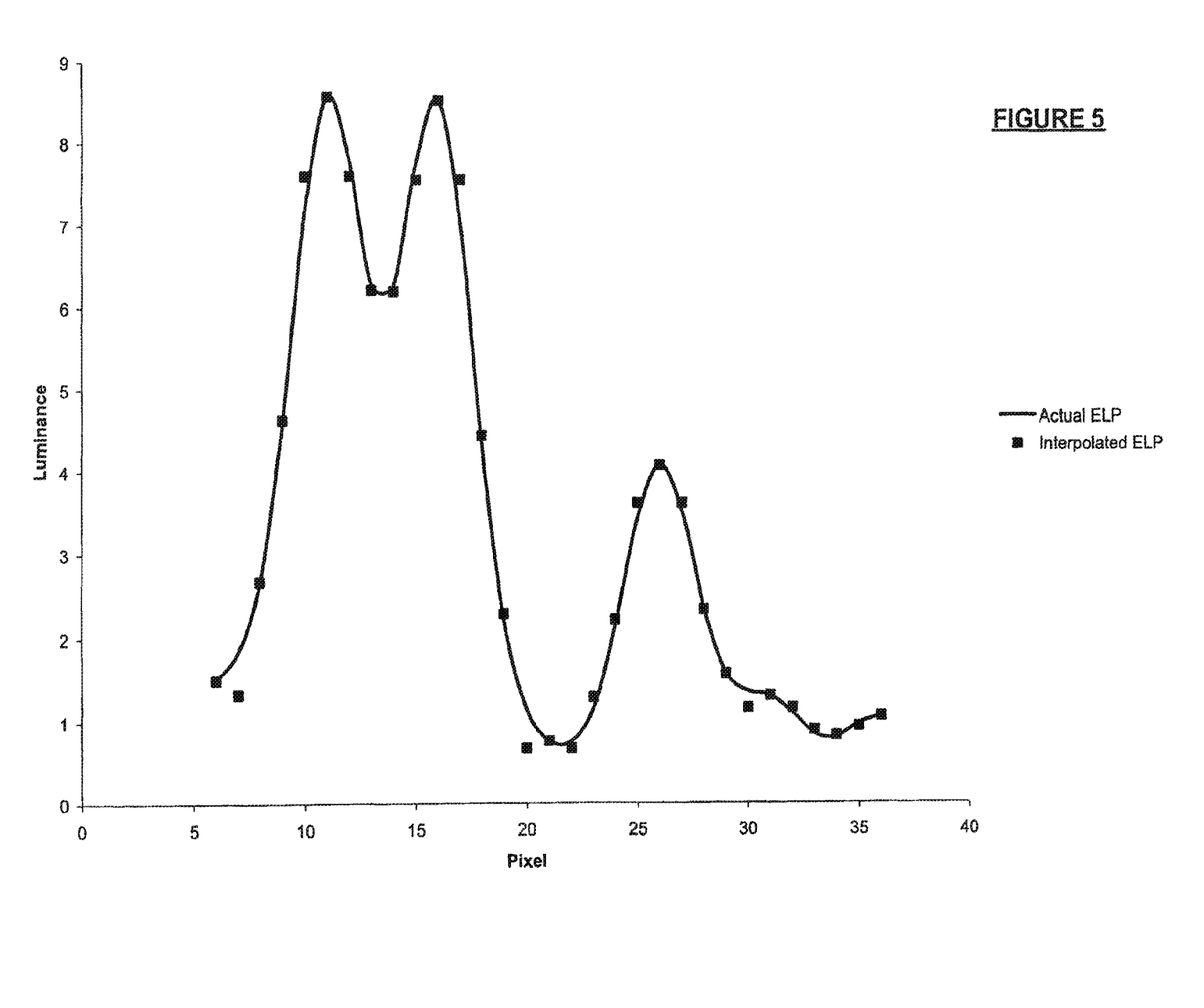
FIG. 5 graphically depicts application of an iteratively-derived interpolation function to derive an interpolated effective luminance pattern (ELP) closely approximating an actual effective luminance pattern (ELP).

For example, FIG. 5 depicts the result obtained by using an iteratively-derived interpolation technique to reduce the resolution of the effective luminance pattern to match the resolution of the LED layer. The pixel values at the LED layer's resolution are not the LED driving values—they are the luminance values of the effective luminance pattern before interpolation. The interpolation function can be determined using standard iteration methods and a random starting condition. As seen in FIG. 5, convolution of the iteratively-derived interpolation function with the effective luminance pattern values yields results which are reasonably close to the actual effective luminance pattern.

Many different interpolation techniques can be used. There need not be any correlation between the interpolation function and the LEDs' point spread function, the LED driving values, or any other characteristic of the display, provided the selected interpolation function and the input parameters selected for use with that function yields a result reasonably close to the actual effective luminance pattern.

Example Embodiments

Figure 6:
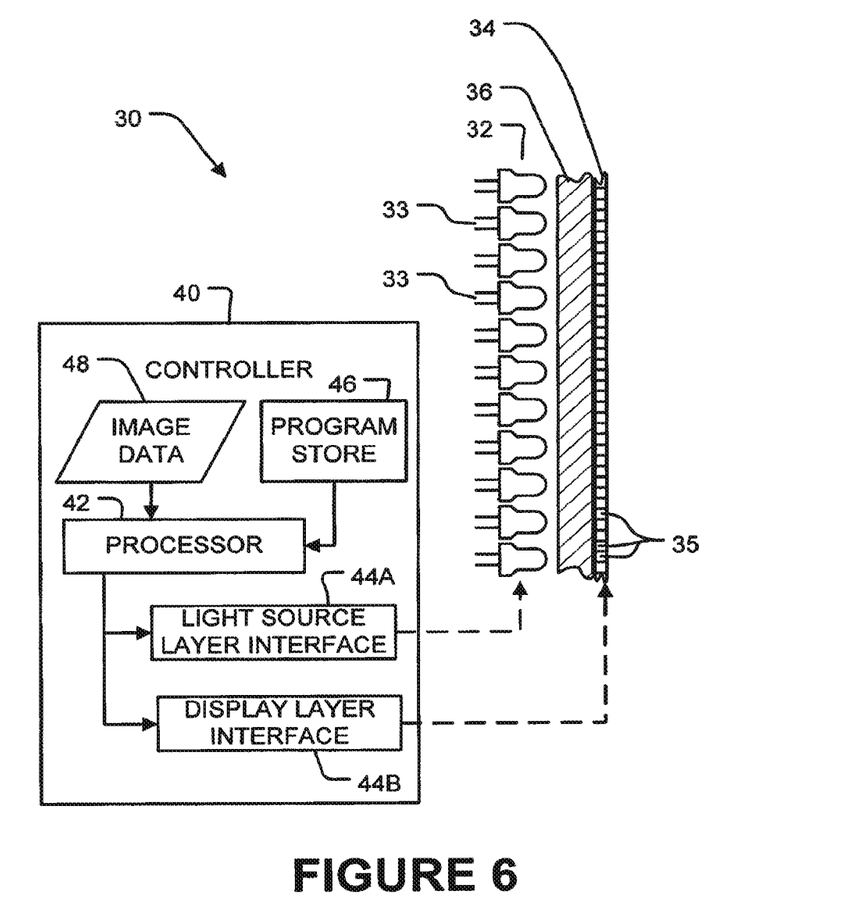
FIG. 6 is a schematic diagram of a display.

FIGS. 6 to 9 show some example embodiments of the invention. FIG. 6 shows a display 30 comprising a modulated light source layer 32 and a display layer 34. Light source layer 32 may comprise, for example:
  an array of controllable light sources such as LEDs;
  a fixed-intensity light source and a light modulator disposed to spatially modulate the intensity of light from the light source;
  some combination of these.

In the illustrated embodiment, light source layer 32 comprises an array of LEDs 33.

Display layer 34 comprises a light modulator that further spatially modulates the intensity of light incident on display layer 34 from light source layer 32. Display layer 34 may comprise an LCD panel or other transmission-type light modulator, for example. Display layer 34 typically has a resolution higher than a resolution of light source layer 32. Optical structures 36 suitable for carrying light from light source layer 32 to display layer 34 may be provided between light source layer 32 and display layer 34. Optical structures 36 may comprise elements such as open space, light diffusers, collimators, and the like.

In the illustrated embodiment a controller 40 comprising a data processor 42 and suitable interface electronics 44A for controlling light source layer 32 and 44B for controlling display layer 34 receives image data 46 specifying images to be displayed on display 30. Controller 40 drives the light emitters (e.g. LEDs 33) of light source layer 34 and the pixels 35 of display layer 34 to produce the desired image for viewing by a person or persons. A program store 46 accessible to processor 42 contains software instructions that, when executed by processor 42 cause processor 42 to execute a method as described herein. Controller 40 may comprise a suitably programmed computer having appropriate software/hardware interfaces for controlling light source layer 32 and display layer 34 to display an image specified by image data 48.

Figure 7:
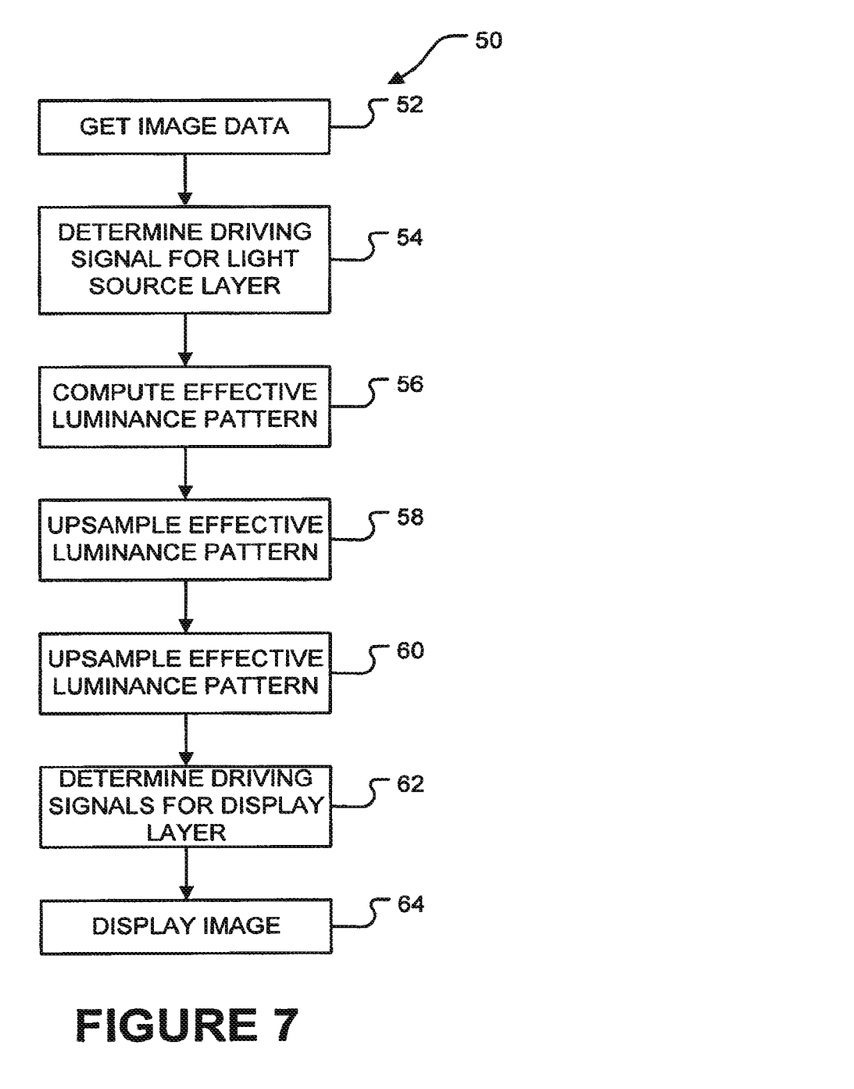
FIG. 7 is a flowchart illustrating a method for displaying an image on a display having a controllable light source layer and a controllable display layer.

FIG. 7 shows a method 50 for displaying image data on a display of the general type shown in FIG. 6. Method 50 begins by receiving image data 48 at block 52. In block 54 first driving signals for light source layer 32 are derived from image data 48. Suitable known methods may be applied to obtain the first driving signals in block 54.

In block 56 method 50 computes an effective luminance pattern. The effective luminance pattern may be computed from the first driving signals and known point spread functions for the light sources of light source layer 32. Block 56 computes the effective luminance pattern at a resolution that is lower than a resolution of display layer 34. For example, block 56 may compute the effective luminance pattern at a resolution that is a factor of 4 or more smaller in each dimension (in some embodiments a factor in the range of 4 to 16 smaller in each dimension) than the resolution of display layer 34.

In block 60 the effective luminance pattern computed in block 58 is upsampled to the resolution of display layer 34. This may be done through the use of any suitable interpolation technique for example. In block 62 second driving signals for the display layer are determined from the upsampled effective luminance pattern and the image data. The second driving signals may also take into account known characteristics of the display layer and any desired image corrections, colour corrections or the like.

In block 64 the first driving signal obtained in block 54 is applied to the light source layer and the second driving signals of block 62 are applied to the display layer to display an image for viewing.

Figure 8:
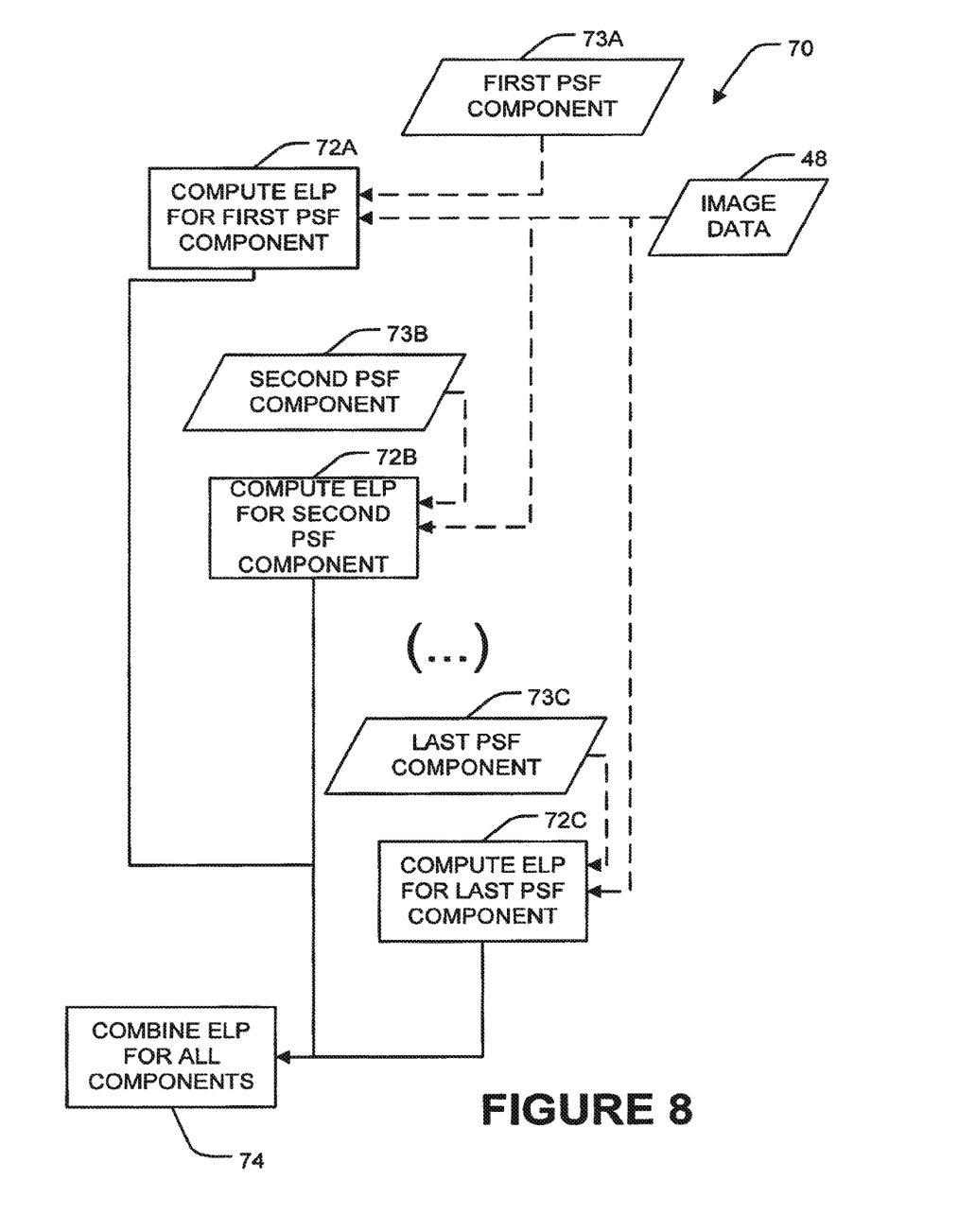
FIG. 8 is a flowchart illustrating a method for determining an effective luminance pattern.

FIG. 8 shows a method 70 for computing an effective luminance pattern. Method 70 may be applied within block 56 of method 50 or may be used in other contexts. Method 70 begins by computing an ELP for each component of the point spread function for the light sources of light source layer 32 (blocks 72A, 72B and 72C—collectively blocks 72). Blocks 72 may be performed in any sequence or may be performed in parallel with one another. FIG. 8 shows three PSF components 73A, 73B and 73C and three corresponding blocks 72. The method could be practised with two or more PSF components 73.

The components of the point spread function (PSF) will typically have been predetermined. A representation of each component is stored in a location accessible to processor 42. Each of blocks 72 may comprise, for each light source of light source layer 32, multiplying values that define a component of the point spread function by a value representing the intensity of the light source. In block 74 the effective luminance patterns determined in blocks 72 are combined, for example by summing, to yield an overall estimate of the effective luminance pattern that would be produced by applying the first driving signals to light source layer 32.

Figure 9:
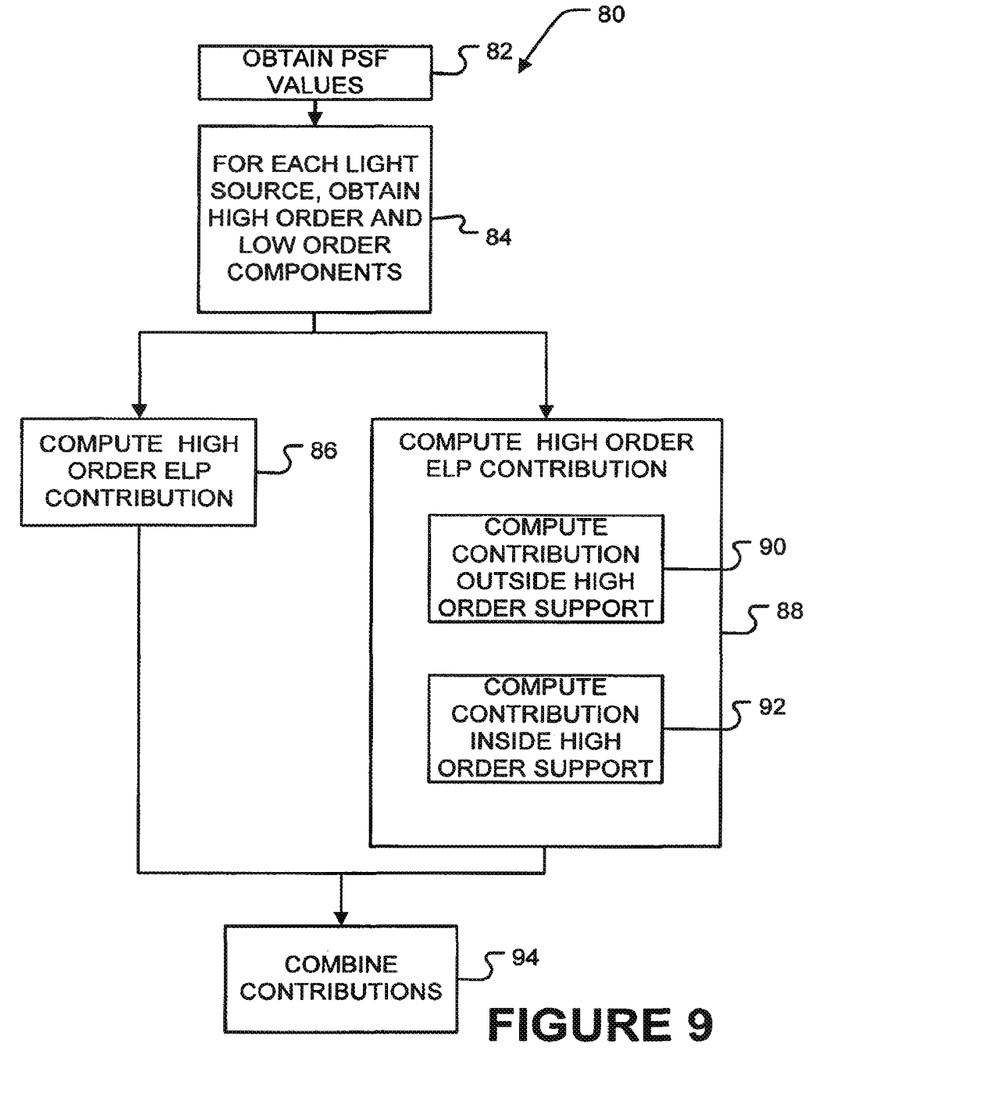
FIG. 9 is a flowchart illustrating a method for determining an effective luminance pattern or a component of an effective luminance pattern.

FIG. 9 illustrates a method 80 that may be applied for computing effective luminance patterns. Method 80 may be applied to:

computing the effective luminance pattern in block 56 of method 50; or computing the effective luminance patterns for individual components of a point spread function in blocks 72 of method 70; or applied in other contexts.

Method 80 begins in block 82 with data characterizing a point spread function (or a PSF component) for a light source of light source layer 32 and data indicative of how intensely the light source will operate under the control of the first driving signals. Method 80 combines these values (e.g. by multiplying them together) to obtain a set of values characterizing the contribution of the light source to the effective luminance pattern at various spatial locations.

Block 84 obtains high-order and low-order components of the resulting values. In some embodiments, the resulting values are 16-bit words, the high-order component is an 8-bit byte and the low-order component is an 8-bit byte.

Contributions to the ELP are determined separately for the high-order and low-order components in blocks 86 and 88. For each light source, the area of support for which values are included in the high-order contribution of 86 is typically significantly smaller than the area of support for which values are included in the low-order contribution of block 88.

Block 88 typically computes the low-order contribution for points located within the area of support of the high-order contribution (block 90) separately than for points located outside of the area of support of the high-order contribution (block 92). Blocks 86, 90 and 92 may be performed in any order or simultaneously.

In block 94 the contributions from blocks 86, 90 and 92 are combined to yield an overall ELP. The computations in blocks 86, 90 and 92 may be performed primarily or entirely in the 8-bit domain (i.e. using 8-bit operations on 8-bit operands) in the case that the high-order and low-order components are 8-bit bytes or smaller.

Certain implementations of the invention comprise computer processors which execute software instructions which cause the processors to perform a method of the invention. For example, one or more processors in a computer or other display controller may implement the methods of FIG. 7, 8 or 9 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The computer-readable signals on the program product may optionally be compressed or encrypted.

Where a component (e.g. a member, part, assembly, device, processor, controller, collimator, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, The light source layer may comprise a number of different types of light source that have point spread functions different from one another;

The display may comprise a colour display and the computations described above may be performed separately for each of a number of colours.

While a number of example aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

What is claimed is:

1. A controller for a display, the controller comprising:
   electronics operable to: (i) output first driving signals useful for controlling a plurality of light sources to emit light having intensities according to the first driving signals and (ii) output second driving signals useful for controlling pixels of a spatial light modulator to modulate light from the light sources;
   a plurality of stored point spread function components, the stored point spread function components collectively representing point spread functions for the plurality of light sources;
   the controller configured to calculate using the plurality of stored point spread function components an effective luminance pattern that would be present at a modulator when the light sources are driven according to the first driving signals and to control the electronics to generate the second driving signals based on the calculated effective luminance pattern.

2. The controller according to claim 1 further comprising software instructions, the software instructions include instructions that cause a data processor to compute a separate component effective luminance pattern for each of the plurality of components of the point spread function and to calculate the effective luminance pattern by combining the component effective luminance patterns.

3. The controller according to claim 2 wherein the plurality of components are a Gaussian decomposition of the point spread function.

4. The controller according to claim 2 wherein combining the component effective luminance patterns comprises summing the component effective luminance patterns.

5. The controller according to claim 2 wherein different ones of the plurality of components have different support radii.

6. The controller according to claim 2 wherein the software instructions include instructions that cause the processor to upsample the effective luminance pattern to a resolution of the modulator using an interpolation technique.

7. The controller according to claim 6 wherein the interpolation technique comprises linear or Gaussian interpolation.

8. The controller according to claim 1 wherein computation of the component effective luminance patterns is performed in the 8-bit domain.

* * * * *